United States Patent
Fujisaki et al.

(10) Patent No.: US 8,127,559 B2
(45) Date of Patent: Mar. 6, 2012

(54) CORE UNIT FOR REFRIGERATION UNIT AND REFRIGERATION UNIT INCLUDING THE CORE UNIT

(75) Inventors: Yukihiro Fujisaki, Nara (JP); Mitsuaki Amano, Nara (JP)

(73) Assignee: Ryoho Freeze-Systems Corporation, Nara-shi (JP)

( * ) Notice: Subject to any disclaimer, the term of this patent is extended or adjusted under 35 U.S.C. 154(b) by 609 days.

(21) Appl. No.: 12/306,996

(22) PCT Filed: Aug. 7, 2007

(86) PCT No.: PCT/JP2007/000845
§ 371 (c)(1),
(2), (4) Date: Dec. 30, 2008

(87) PCT Pub. No.: WO2008/117341
PCT Pub. Date: Oct. 2, 2008

(65) Prior Publication Data
US 2009/0199570 A1    Aug. 13, 2009

(30) Foreign Application Priority Data
Mar. 22, 2007  (JP) .................. 2007-073999

(51) Int. Cl.
*F25B 21/00*  (2006.01)

(52) U.S. Cl. ......................................... 62/3.1

(58) Field of Classification Search ............... 62/3.1
See application file for complete search history.

(56) References Cited

U.S. PATENT DOCUMENTS

| | | | |
|---|---|---|---|
| 6,499,535 B2* | 12/2002 | Cowans ................... | 165/206 |
| 6,502,410 B2* | 1/2003 | Podtchereniaev et al. ... | 62/114 |
| 7,405,664 B2* | 7/2008 | Sakama et al. .......... | 340/572.7 |
| 2008/0078184 A1* | 4/2008 | Saito et al. ............. | 62/3.1 |
| 2010/0083687 A1* | 4/2010 | Handa et al. ........... | 62/419 |

FOREIGN PATENT DOCUMENTS

| | | |
|---|---|---|
| JP | 2000-325062 A | 11/2000 |
| JP | 2003-214751 A | 7/2003 |

OTHER PUBLICATIONS

International Search Report of PCT/JP2007/000845, Mailing Date of Nov. 13, 2007.

\* cited by examiner

*Primary Examiner* — Cheryl J Tyler
*Assistant Examiner* — Melanie Reuter
(74) *Attorney, Agent, or Firm* — Westerrman, Hattori, Daniels & Adrian, LLP

(57) ABSTRACT

A refrigeration unit is provided without impairing freshness, as before freezing, after thawing frozen subjects, and, with providing excellent color of dark colored flesh of fish/meat, especially in the case of using perishable food, such as meat or fish, for subjects to be frozen. A core unit for a refrigerator, between a substantially-rectangular first plate member and a substantially-rectangular second plate member spaced apart and arranged in parallel toward each other, where an electric wave is propagated to the sides of the first plate member and the second plate member by an electric wave transmission antenna, and that can form a unidirectional and substantially-uniform static magnetic field in substantially-normal directions of a principal surface of the first plate member and a principal surface of the second plate member, is used.

6 Claims, 3 Drawing Sheets

[Fig. 1]
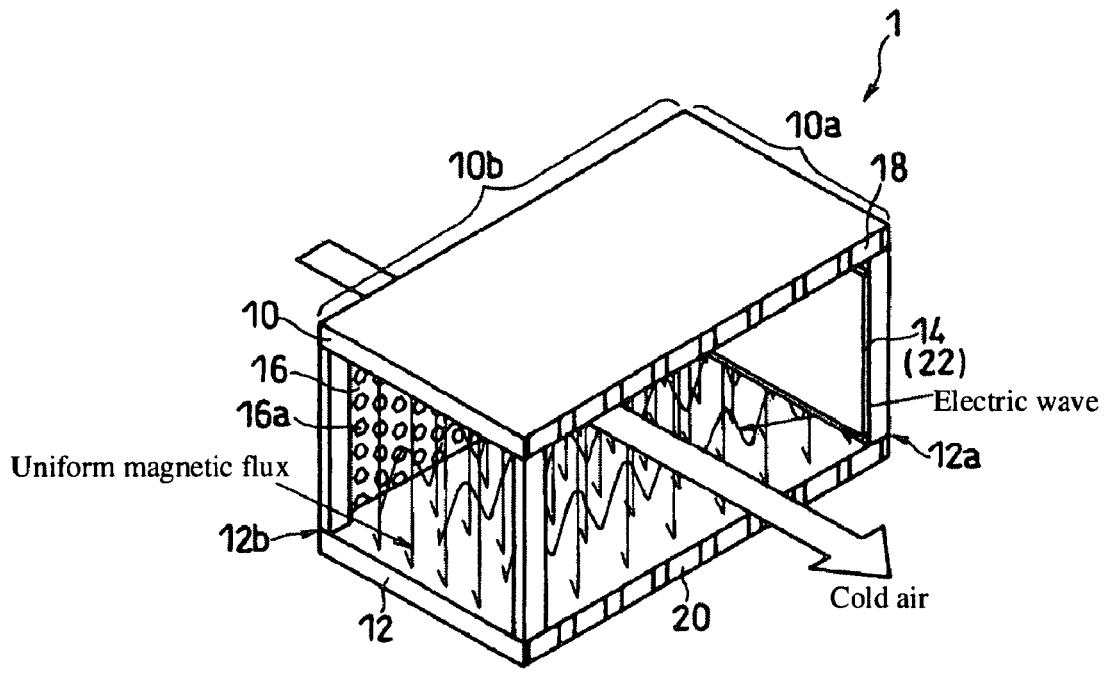
[Fig. 2]
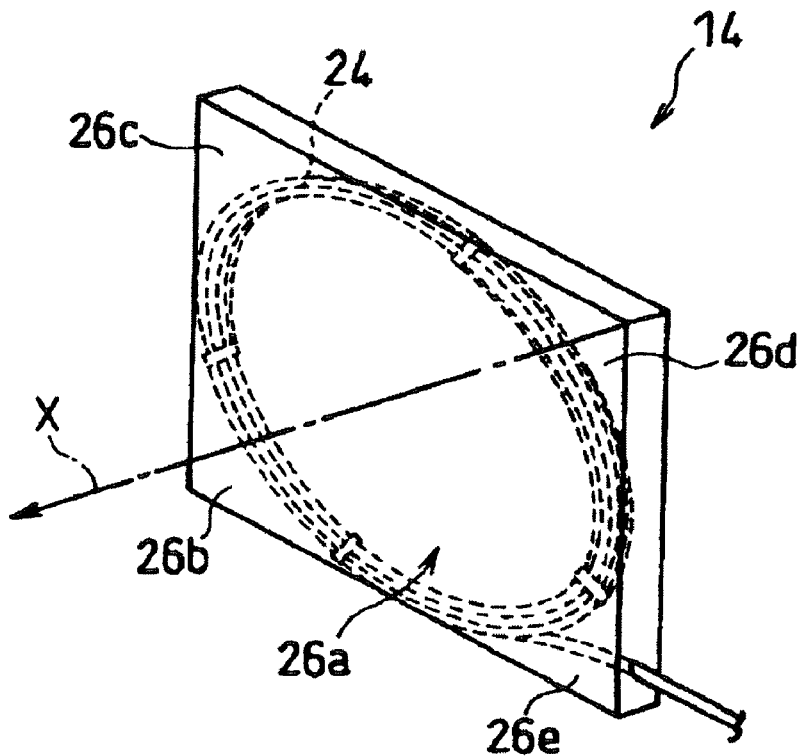

[Fig. 3]
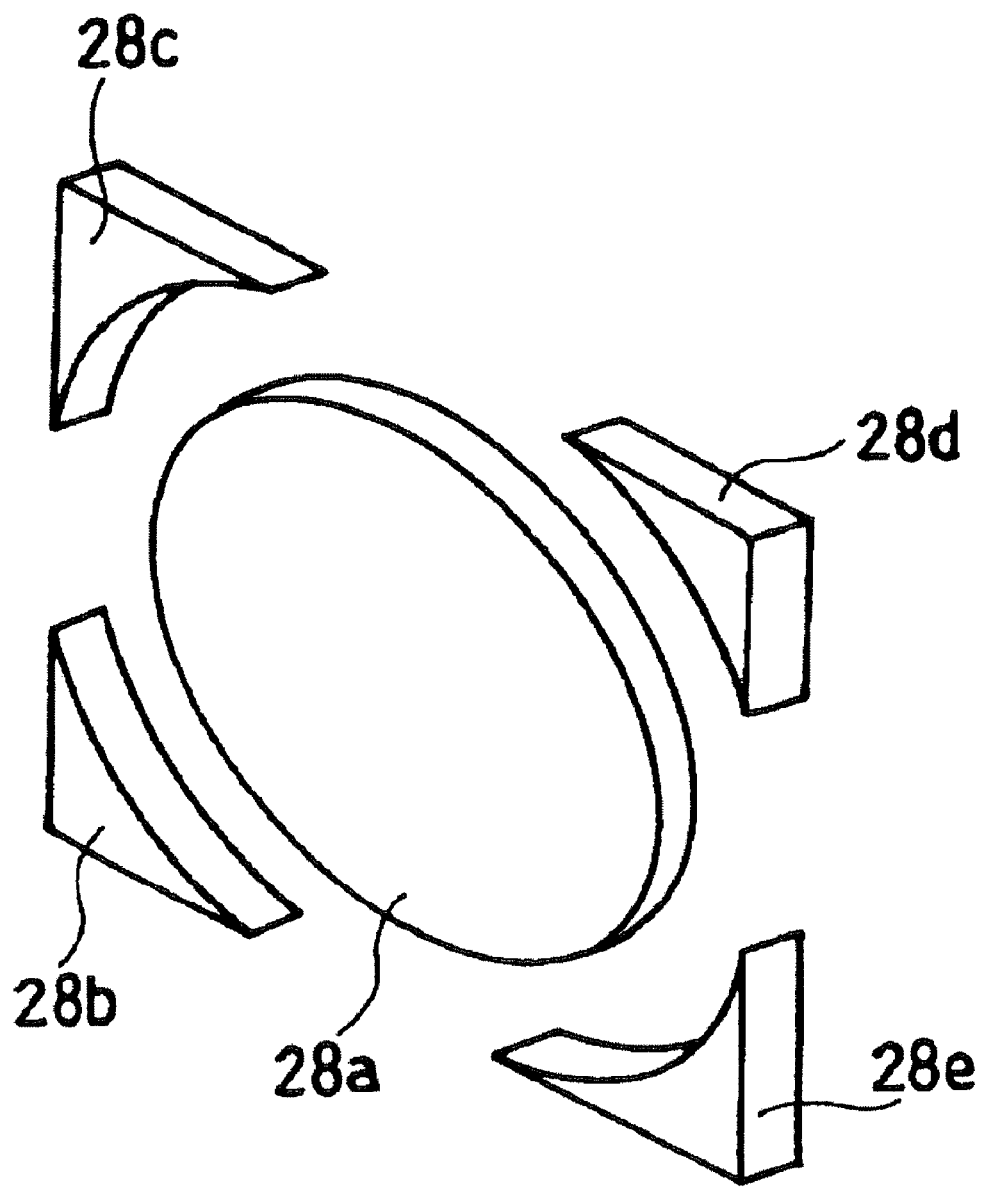

[Fig. 4]
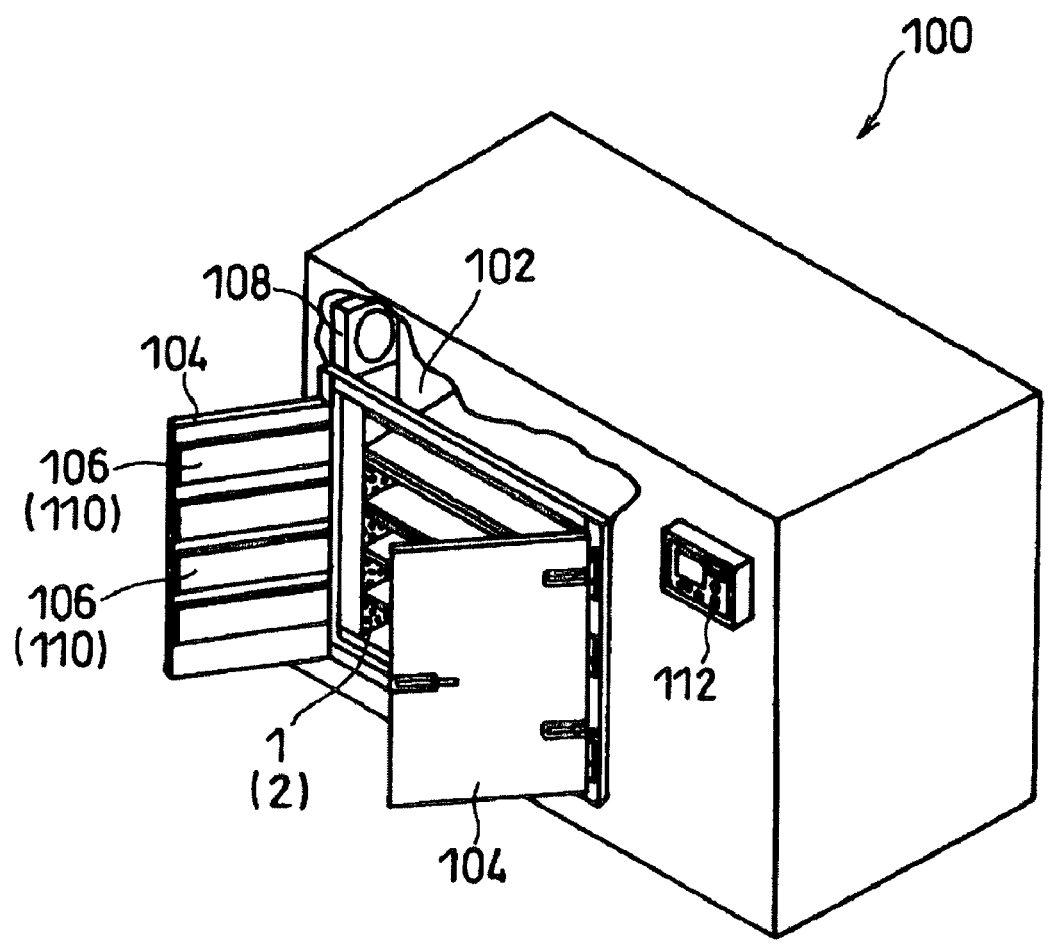

CORE UNIT FOR REFRIGERATION UNIT AND REFRIGERATION UNIT INCLUDING THE CORE UNIT

TECHNICAL FIELD

The present invention relates to a core unit preferably used for a refrigeration unit that does not cause a loss of freshness, as before freezing, after thawing of frozen subjects, and a refrigeration unit using said core unit.

BACKGROUND TECHNOLOGY

Conventionally, as a method of preserving subjects to be frozen, such as cooking ingredients or food products including fish and vegetables, living bodies or biological samples, while freshness thereof is maintained for a long time, cryopreservation is being adopted; however, it is very much a situation where reduction of quality and freshness due to a change in color tone of subjects to be frozen, deterioration of taste or drip loss (separation of moisture from frozen subjects at the time of thawing) cannot be completely prevented.

The subjects to be frozen contain a large quantity of moisture including bonding water constrained to particles, such as protein comprising the subjects to be frozen, and free water that can freely travel within the subjects to be frozen. At the time of freezing, the free water freezes and ice crystals are produced and grow to increase their volumes, and the structure of cells contained in the frozen subjects is destroyed. Consequently, at the time of thawing the frozen subjects, drip loss occurs due to the destroyed structure, and it becomes difficult to restore the frozen subjects to a fresh condition as before freezing.

In general, volume expansion of ice crystals occurs when a time of passing for a temperature area of ice crystal formulation is long. Taking this point into consideration, various refrigeration units and freezing methods so as not to loose freshness, as before freezing, after thawing have been proposed. For example, a method where a subject to be frozen are rapidly cooled down so as to promptly pass through an ice crystal formation temperature area by immersing the subject to be frozen into a liquid refrigerant or by spraying a liquid refrigerant to the subject to be frozen, and volume expansion of the ice crystal is prevented can be considered.

However, in the method where a subject to be frozen are immersed into a liquid refrigerant or a liquid refrigerant is sprayed over a subject to be frozen, even though it is possible to rapidly cool down a surface layer of the subject to be frozen, a frozen layer tends to be formed only on the surface layer. Then, a rate of cooling of the inside of the subject to be frozen is controlled according to heat transfer from the surface; however, it is delayed because the heat transfer is inhibited due to a presence of the ice crystallized frozen layer on the surface layer, and there is a problem where the volume expansion of the ice crystals cannot be effectively prevented inside the frozen subject.

With regard to this problem, for example, in Patent Literature 1, a super-rapid refrigeration unit having a freezer that can cool down peripheral temperature of contained frozen subjects to from −30 degrees C. to −100 degrees C, and a magnetic field generation means including a static magnetic field generation means that makes a magnetic field, which unidirectionally fluctuates, act on a subject to be frozen and a dynamic magnetic field generating means is proposed.

Further, for example, in Patent Literature 2, in order to solve the problem in Patent Literature 1, in other words, to solve the problem where a variable magnetic field lacks in uniformity and an effect of the variable magnetic field is not uniformly demonstrated to a subject to be frozen and deterioration in partial quality is confirmed, application of a uniform variable magnetic field to the subject to be frozen is proposed.

Patent Literature 1: pamphlet of International Publication No. 01/24647

Patent Literature 2: Japanese Patent Application Laid-Open No. 2003-139460

DISCLOSURE OF THE INVENTION

Problem to be Solved by the Invention

However, in the prior art, oxygen existing around the periphery of a subject to be frozen cannot be completely eliminated, and particularly, in the case that a subject to be frozen is perishable food, such as meat or fish, there is a problem that hemoglobin and myoglobin contained in a blood component becomes methemoglobin and metmyoglobin via freezing and thawing, respectively, and the color of dark colored flesh of fish/meat after thawing is not acceptable.

Then, the objective of the present invention is to provide a refrigeration unit where a color of dark colored flesh of fish/meat can be excellently maintained without impairing freshness, as before freezing, after thawing a frozen subject, particularly in the case that a subject to be frozen is perishable food, such as meat or fish.

Means for Solving the Problem

In order to solve the above-mentioned problem, as a result of keen examination by inventors of the present invention for the purpose of inhibiting deterioration of the color of dark colored flesh of fish/meat, deterioration due to an impact on subjects to be frozen at the time of handling and deterioration due to long-term preservation, using perishable food, such as Japanese amberjack, yellow tail, tuna and bonito before and after freezing, they discovered that a loss of freshness, as before freezing, can be inhibited at maximum even via natural thawing or thawing in a refrigerator.

In other words, the present invention provides a core unit for a refrigeration unit, comprising:

a substantially-rectangular first plate member and a substantially-rectangular second plate member spaced apart and arranged in parallel with each other;

an electric wave transmission antenna arranged between first edges of the first plate member and the second plate member so as to enable the transmission of an electric wave toward sides of the first plate member and the second plate member; and first magnetic bodies arranged in the first plate member at the side of the second plate member, and second magnetic bodies arranged in the second plate member at the side of the first plate member, wherein unidirectional and substantially-uniform static magnetic field is formed in substantially normal directions of a principal surface of the first plate member and a principal surface of the second plate member between the first plate member and the second plate member.

In the core unit for a refrigeration unit having this configuration, between the first plate member and the second plate member, a unidirectional and substantially-uniform static magnetic field can be formed in substantially-normal directions of a principal surface of the first plate member and a principal surface of the second plate member; concurrently, an electric wave can be transmitted in a direction substantially perpendicular to the direction of the static magnetic field.

Then, if the core unit is mounted to a refrigeration unit and subjects to be frozen are frozen in an environment exposed to the static magnetic field and the electric wave, a loss of the freshness of the subject to be frozen, as before freezing, can be prevented at maximum even via natural thawing or thawing in the refrigerator.

The above-mentioned effect has not been scientifically proved determinably; however, the inventors of the present invention believe that the effect is based upon the mechanism mentioned below. In other words, free water (water molecules) in a subject to be frozen becomes substantially and uniformly arranged at predetermined intervals due to unidirectional and roughly-uniform static magnetic field, and the water molecules oscillate due to propagating electric waves in said condition, and the subjects to be frozen are frozen while the intervals are secured.

Normally, when water is frozen and ice is made, the volume expands due to hydrogen bond among the water molecules; however, when the subjects to be frozen is frozen under the above-mentioned condition, because the subject is frozen while the water molecules are arranged under a roughly constant condition, the change in volume of moisture contained in the subjects to be frozen can be effectively inhibited before freezing and after thawing, destruction of the cells in the frozen subjects can be prevented. As a result, it is believed that freshness, as before freezing, can be maintained after thawing.

In other words, because the subject to be frozen is frozen while static magnetic field and an electric wave are irradiated in a predetermined direction, the subject can be frozen while free water (water molecules) is arranged in a constant direction particularly due to the static magnetic field and the water molecules having a constant fluctuation particularly due to the electric wave, volume expansion of ice crystals at the time of freezing and drip loss due to destruction of cells containing moisture and thawing can be effectively prevented, and freshness of frozen subjects, as before freezing, can be further certainly maintained after thawing.

Further, it is preferable that the core unit for a refrigeration unit relating to the present invention comprises a current plate arranged between second edges of the first plate member and the second plate member so as to enable rectification of air flowing toward sides of a first plate member and a second plate member, and the first plate member, the second plate member and the current plate are arranged with the position relationships where a principal surface of the first plate member and a principal surface of the second plate member are substantially perpendicular to a principal surface of the current plate are, respectively.

According to this configuration, when the core unit is mounted to a refrigeration unit, cold air can be supplied to an entire subject to be frozen arranged between the first plate member and the second plate member, and the freezing efficiency can be improved.

In the core unit for a refrigeration unit of the present invention, as the electric wave transmission antenna, a coil antenna can be preferably used. According to this configuration, an electric wave can be further certainly propagated between the first plate member and the second plate member.

Further, it is preferable to cover the electric wave transmission antenna with a waterproof cover. Normally, moisture exists within a refrigeration unit, and if a metal member rusts due to this moisture, its durability is decreased, so it is preferable to apply a waterproof processing.

Further, it is preferable that first magnetic bodies and second magnetic bodies are made of permanent magnet. According to this configuration, a static magnetic field can be formed semi-permanently between the first magnetic bodies and the second magnetic bodies.

Further, it is preferable that the current plate is made of a stainless steel plate having openings. According to this configuration, when the core unit is mounted to a refrigeration unit, cold air can be supplied to an entire subject to be frozen arranged between the first plate member and the second plate member, and the freezing efficiency can be improved. Further, the reduction in the durability within the refrigeration unit where moisture is present can be inhibited by using the stainless steel plate.

In addition, the present invention provides a refrigeration unit comprising:

the above-described core unit(s) for a refrigeration unit; and a freezer containing the core unit(s).

According to the refrigeration unit having this configuration, a unidirectional and substantially-uniform static magnetic field can be formed in substantially normal directions of a principal surface of the first plate member and a principal surface of the second plate member; concurrently, an electric wave can be propagated in a direction that is substantially perpendicular to the direction of said static magnetic field. Then, if a subject to be frozen is frozen in an environment exposed to the static magnetic field and the electric wave, a loss of freshness of the subject to be frozen, as before freezing, can be maintained at minimum via natural thawing or thawing in a refrigerator.

In addition, the present invention also provides a refrigeration unit, comprising:

the above-described core unit(s) for a refrigeration unit;

a freezer containing the core unit(s); and a cold air circulation unit for supplying cold air between the first plate member and the second plate member via the current plate.

According to the refrigeration unit having this configuration, cold air can be supplied to an entire subject to be frozen arranged between the first plate member and the second plate member, and the freezing efficiency can be improved.

Efficacy of the Invention

According to the present invention, a refrigeration unit that can preferably maintain color of dark colored flesh of fish/meat after thawing without impairing freshness of frozen subjects, as before freezing, after thawing, and especially in the case that the subject to be frozen is perishable food, and a refrigeration unit that can excellently maintain the color of dark colored flesh of fish/meat after thawing and a core unit mounted to the refrigeration unit can be provided.

BRIEF DESCRIPTION OF DRAWINGS

FIG. 1 is a perspective view showing one embodiment of a configuration of a core unit for a refrigeration unit of the present invention to be mounted in the refrigeration unit of the present invention.

FIG. 2 is an enlarged view showing one example of an electric wave transmission antenna 14.

FIG. 3 is an outline perspective view of filling members 28a, 28b, 28c, 28d and 28e to be filled in spaces 26a, 26b, 26c, 26d and 26e inside a waterproof cover 22 of the electric wave transmission antenna 14.

FIG. 4 is a partially-cutaway outline perspective view showing one embodiment of a refrigeration unit 100 of the present invention where a core unit 1 for refrigeration unit of the present invention shown FIG. 1 is mounted.

BEST MODE FOR CARRYING OUT THE INVENTION

Hereafter, preferred embodiments of the present invention will be described with reference to drawings. However, the present invention shall not be limited to these.

FIG. 1 is a perspective view showing one embodiment of a configuration of the core unit for a refrigeration unit of the present invention to be mounted in a refrigeration unit of the present invention; and FIG. 4 is a partially-cutaway outline perspective view showing one embodiment of the refrigeration unit 100 of the present invention where the core unit 1 for a refrigeration unit of the present invention is shown in FIG. 1.

As shown in FIG. 1, the core unit 1 of the present embodiment are composed of a substantially-rectangular first plate member 10, a substantially-rectangular second plate member 12, an electric wave transmission antenna 14, a current plate 16, first magnetic bodies 18 and second magnetic bodies 20; and the first plate member 10, the second plate member 12 and the current plate 16 are arranged in the positional relationship where a principal surface of the first plate member 10 and a principal surface of the second plate member 12 are substantially perpendicular to a principal surface of the current plate 16, and a unidirectional and substantially-uniform static magnetic field (substantially-uniform magnetic flux) is formed in the substantially-normal directions of a principal surface of the first plate member 10 and a principal surface of the second plate member 12.

"Unidirectional and substantially-uniform static field" defines that magnetic lines travel substantially linearly in a one direction from a principal surface of the first plate member 10 toward a principal surface of the second plate member 12 or from a principal surface of the second plate member 12 toward a principal surface of the first plate member 10 in the space between the first plate member 10 and the second plate member 12, and the density of magnetic flux is substantially consistent in any portion on a plane in substantially parallel to the principal surface of the first plate member 10 and the principal surface of the second plate member 12, respectively.

The substantially-rectangular first plate member 10 and the substantially-rectangular second plate member 12 are arranged to be facing in parallel with each other and spaced apart, and a subject to be frozen shall be arranged in said space, i.e., on the second plate member 12. The first plate member 10 and the second plate member 12 can be formed with various materials; however, it is preferable to use materials that will not be deteriorated due to moisture and low temperature. For example, a generally-structural rolled steel, such as SS330, SS400, SS490 and SS540, can be used.

The electric wave transmission antenna 14 is arranged between the first edge 10a of the first plate member 10 and the first edge 12a of the second plate 12 so as to enable the propagation of an electric wave to the sides of the first plate member 10 and the second plate member 12 (in other words, in the space between the first plate member 10 and the second plate member 12). As this electric wave transmission antenna, conventionally-known various antennas can be used; however, it is preferable to use a coil antenna from viewpoints that an electric wave can be certainly transmitted even with low power and the dimension will not be excessively greater by taking the frequency into consideration.

Further, the coil antenna can be formed with an electric wire or a coaxial cable, and various electric wires and coaxial cables can be used from viewpoints of insulation properties, electric permittivity, cold-hardy temperature and dimension. The electric wires include, for example, an electric wire formed with a copper wire and an external insulating coating (for example, made of fluorine resin) that coats the copper wire. Further, the coaxial cable, for example, includes a coaxial cable formed with a copper internal conductor, a polyethylene insulator covering said internal conductor, an external conductor formed with a reticular copper conductor covering the insulator, and an external insulating coating (for example, made of fluorine resin) that coats the external conductor.

The electric wave transmission antenna 14 shown in FIG. 1 is covered with a box-state waterproof cover 22 for the purpose of preventing the deterioration due to moisture and low temperature. The waterproof cover 22 should be formed with a material that does not block propagation of an electric wave but has a waterproof effect, and various materials can be used. For example, from the viewpoint of strength, a use of various fiber-reinforced plastic (RFP) can be considered. Furthermore, as a filling material to be used for the fiber-reinforced plastic, for example, any of pulp, glass, carbon and Bakelite can be used or a plurality of them may be used.

FIG. 2 shows an enlarged view of one example of the electric wave transmission antenna 14. As shown in FIG. 2, this electric wave transmission antenna 14 comprises a box-state waterproof cover 22 and a coil antenna 24 internally arranged in the waterproof cover 22. An amplifier is connected to the coil antenna 24, for example, via a feeder cable, and an electric wave can be propagated to the arrow X direction by applying an electric current. Furthermore, regarding the number of windings and the thickness of the coil antenna can be appropriately selected by taking the frequency to be described later into consideration, by a person with ordinary skills in the art pertaining to the present invention.

Further, in order to position the coil antenna 24, it is preferable to fill filling members (spacers) 28a, 28b, 28c, 28d and 28e, such as polystyrene foam (foam material), into the spaces 26a, 26b, 26c, 26d and 26e inside the waterproof cover 22 shown in FIG. 2, respectively. Furthermore, FIG. 3 is an outline perspective view of the filling members 28a, 28b, 28c, 28d and 28e to be filled into the spaces 26a, 26b, 26c, 26d and 26e inside the waterproof cover 22 of the electric wave transmission antenna 14.

The filling member 28e has a substantially disk-shape, and the filling members 28, 28c, 28d and 28e have a shape to fill the spaces 26b, 26c, 26d and 26e at the four corners within the waterproof cover 22. It is possible to position the coil antenna 24 by using the filling member 28a or any of the filling members 28b, 28c, 28d and 28e.

It is needless to say, the coil antenna 24 can be arranged by securing to the waterproof cover 22, not using this filling member but using a strap made of a material that does not affect the propagation of an electric wave. Further, in order to make further certain about the waterproof effect, for example, it is preferable to seal an opening or a gap, for example, with a silicone resin waterproof material.

The current plate 16 is arranged between the second edge 10b of the first plate member 10 and the second edge 12b of the second plate member 12 so as to enable the rectification of the cold air flowing toward sides of the first plate member 10 and the second plate member 12 (in other words, in the space between the first plate member 10 and the second plate member 12); in other words, the first plate member 10, the second plate member 12 and the current plate 16 are arranged in the positional relationship where the principal surface of the first plate member 10 and the principal surface of the second plate member 12 are substantially perpendicular to the principal surface of the current plate 16.

As this current plate 16, various current plates can be used; however, from viewpoints of inexpensive [cost], easy processing and easy obtainment of the rectification, it is preferable to use the current plate 16 having a plurality of arranged openings 16a.

The openings 16a in FIG. 1 are hexagonal, respectively; however, the shape is not limited to this, but it can be circular, eclipse, triangular or any other polygonal. Various shapes may be combined. The shape, dimension, the number and an arrangement method of the opening 16a may be appropriately adjusted by taking the quantity, direction and access location into consideration.

Further, for a material forming the current plate 16, as long as the material shall not be deteriorated by moisture or low temperature, and as long as the openings 16a can be easily formed via processing, any material can be used without any special restriction. For example, various stainless steels (for example, SUS304) having various thicknesses can be used.

For the first magnetic bodies 18 and the second magnetic bodies 20, a south pole of one of the magnetic bodies and a north pole of the other magnetic bodies face toward each other so as to form one directional and substantially-uniform static magnetic field. In FIG. 1, it is configured such that a plurality of the first magnetic bodies 18 and a plurality of the second magnetic bodies 20 are buried into the first plate member 10 and the second plate member 12, respectively. The first magnetic bodies 18 and the second magnetic bodies 20 may be arranged on the surfaces of the first plate member 10 and the second plate member 12, respectively.

As the first magnetic bodies 18 and the second magnetic bodies 20, various magnets can be used; however, from the viewpoint to further certainly obtain the efficacy of the present invention, it is preferable to use a magnet that can generate a static magnetic field with, for example, 10 to 2,000 Gs, preferably 50 to 1,000 Gs, and further preferably 100 to 150 Gs in the space between the first plate member 10 and the second plate member 12.

As a magnet to be used for the first magnetic bodies 18 and the second magnetic bodies 20, from the viewpoint where a characteristic as a magnet can be maintained throughout a comparatively long time without a supply of a magnetic field or an electric current from the outside, for example, it is preferable to use a permanent magnet, such as alnico magnet, ferrite magnet or neodymium magnet. Among them, the ferrite magnet, which is inexpensive because iron oxide is a primary raw material, and which has high magnetic permeability, and which is used for various uses, is preferable.

The alnico magnet is a magnet (cast magnet) that is cast using aluminum (Al), nickel (Ni) and cobalt (Co) as raw materials, and iron and/or copper may be added as additives. For the ferrite magnet, iron oxide is used as a primary raw material and minute amounts of barium and strontium are added and baked & solidified, and then, the ground obtainment is molded and sintered, and it is magnetized by an electromagnet. The neodymium magnet is a rare-earth magnet using neodymium, iron and boron as primary components. Among them, the ferrite magnet, which is inexpensive because iron oxide is a primary raw material, and which has high magnetic permeability, and which is used for various uses, is preferable.

The shape, dimension and quantity of the first magnetic bodies 18 and the second magnetic bodies 20 are appropriately selected so as to form a unidirectional and substantially-uniform static magnetic field in substantially-normal directions of the principal surface of the first plate member 10 and the principal surface of the second plate member 12 and to form substantially-equal magnetic fluxes.

Next, as shown in FIG. 4, the refrigeration unit 100 relating to this embodiment comprises the core unit 1 for a refrigeration unit of the present invention, a freezer 102, a door 104, an electric wave reception antenna 106, a cold air circulating device 108 and a control panel 112 for operating a control device (not shown) for the purpose of controlling the refrigeration unit 100.

A core unit stack 2 where four core units 1 for a refrigeration unit of the present invention as described above are layered is contained in the refrigeration unit 100 relating to this embodiment. The number of the core units 1 to be layered is not particularly limited but the number is appropriately changeable according to the specifications of the refrigeration unit 100.

The doors 104 that open to both sides are arranged in the refrigeration unit 100 so as to close the freezer 102 that contains the core unit stack 2. Then, four electric wave reception antennas 106 are arranged so as to face toward the electric wave transmission antenna 14 (see FIG. 1) contained in the core unit 1 inside the doors 104 on the occasion of closing the doors 104.

As this electric wave reception antenna 106, as shown with an arrow in FIG. 1, various antennas can be used as long as they can propagate an electric wave toward a direction, which is substantially perpendicular to the direction of the static magnetic field (magnetic flux), in the space between the first plate member 10 and the second plate member 12. Various conventionally-known antennas can be used, and the same one as the electric wave transmission antenna 14 may be used.

In this specification, although the expression as an electric wave "reception" antenna is used, this electric wave reception antenna 106 does not receive any electric wave, but transmits an electric wave as similar to an electric wave transmission antenna 14. In other words, the electric wave reception antenna 106 can also be referred to as the second electric wave transmission antenna 14. In this specification, because the electric wave reception antenna 106 is arranged at the position opposing to the electric wave transmission antenna 14, the expressions of "transmission" and "reception" are used as a matter of convenience. In addition, depending upon dimensions and specifications of the core unit 1, the freezer 102 and/or the refrigeration unit 100, the electric wave reception antenna 106 does not have to be arranged. The antenna for transmitting an electric wave may exist only at one side of the core unit 1.

Further, the electric wave reception antennas 106 shown in FIG. 4 are covered with the box-state waterproof covers 110 in order to prevent the deterioration due to moisture and low temperature, respectively. As the waterproof cover 110, the same one as the waterproof cover 22 for the electric wave transmission antenna 14 can be used.

Further, it is not shown in the drawings, but a transmitter and a high-frequency amplifier for propagating the electric wave are arranged in the refrigeration unit 100. As the transmitter and the high-frequency amplifier, conventionally-known ones can be used; however, it is preferable to design them so as to enable the propagation of electric waves with the frequency mentioned below.

In other words, as the electric wave, for example, it is preferable to use an electric wave contained in a region of radio wave having a frequency of, for example, approximately 300 kHz to approximately 2 MHz, preferably, approximately 500 kHz to approximately 1 MHz, and further preferably, approximately 600 kHz to approximately 1 MHz. If the electric wave with longer wavelength is supplied to a subject to be frozen, water molecules contained in the subject to be frozen can be oscillated without greatly changing their positions, and arrangement of the water molecules at the time of freezing can be further certainly realized interdependently with the static magnetic field.

The cold air circulating device 108 is for supplying cold air to a subject to be frozen via the openings 16a of the current plate 16. If the cold air circulating device 108 is mounted, it prevents uneven distribution of cold air within the freezer 102, and it becomes possible to certainly and evenly freeze individual subjects to be frozen.

Herein, the refrigeration unit 100 has the freezer 102 having a freezing function. Furthermore, the freezer 102 in FIG. 4 is a rack type batch system; however, other than this, any of a tunnel type and spiral type can be applicable, and the present invention can be implemented by appropriately modifying the design in each case.

This is not shown in the drawings, but the refrigeration unit 100 can contain at least a freezing means and may contain at least one of a refrigeration means and a freezing-refrigeration storage means. As the freezing means, for example, a normally-known rapidly-freezing cycle device, which comprises a compressor, a condenser, an expansion valve and a cooling pipe (evaporator), and which circulates refrigerant, can be used. Furthermore, the expansion valve and the cooling pipe (evaporator) are arranged in the inner space of the refrigeration unit 100, and they contribute to the generation of cold air.

In addition, in order to accelerate the rapid temperature reduction in a subject to be frozen, the inner surface of the refrigeration unit 100 may be formed with a heat insulating material or a member having a far-infrared radiation absorbing capability. With this design, radiation heat (far-infrared ray) radiated from the subject to be frozen can be promptly absorbed, and it becomes possible to promptly realize the temperature reduction of the subject to be frozen.

According to the refrigeration unit 100 of the present invention having the above-mentioned configuration, a subject to be frozen can be frozen while its freshness is maintained, and the impairment of freshness can be certainly prevented even after thawing.

However, the present invention is not limited to the above-mentioned one embodiment. For example, the number of the core units can be appropriately changed. Further, when the refrigeration unit is a rack type batch system, the configuration as shown in FIG. 4 may be adopted; however, if a refrigeration unit is a tunnel type and subjects to be frozen are continuously contained and frozen by a net conveyor belt in the inner closed space of the refrigeration unit, another configuration where a belt conveyor travels between the first plate member and the second plate member can be adopted.

Further, when the refrigeration unit is a spiral type and subjects to be frozen are continuously contained to be spiral-state to the inner closed space of the refrigeration unit by a belt conveyor, and they are frozen while they move from the lower side to the upper side, the belt conveyor is interposed between the first plate member and the second plate member may be adopted.

INDUSTRIAL APPLICABILITY

According to the present invention, a refrigeration unit that can maintain the excellent condition of the color of dark colored flesh of fish/meat after thawing without impairing freshness, as before freezing, especially when the subject to be frozen is perishable food, such as meat or fish, can be provided. Therefore, the refrigeration unit relating to the present invention can be preferably used in the food industry including restaurants, sushi restaurants, Japanese style pubs and culinary art restaurants. In addition, utilization of the present invention in the pharmaceutical industry, medical supply industry and healthcare industry conducting clinical trials, and preparing cultured skin using the present invention can also be considered.

The invention claimed is:

1. A core unit for a refrigeration unit, comprising:
a substantially-rectangular first plate member and a substantially-rectangular second plate member spaced apart and arranged in parallel with each other;
an electric wave transmission antenna arranged between first edges of the first plate member and the second plate member so as to enable the transmission of an electric wave toward sides of the first plate member and the second plate member; and
first magnetic bodies arranged in the first plate member at the side of the second plate member, and second magnetic bodies arranged in the second plate member at the side of the first plate member; and
a current plate arranged between opposing second edges of the first plate member and the second plate member so as to enable rectification of air flowing toward sides of the first plate member and the second plate member,
wherein unidirectional and substantially-uniform static magnetic field is formed in substantially normal directions of a principal surface of the first plate member and a principal surface of the second plate member between the first plate member and the second plate member, and
the first plate member, the second plate member and the current plate are arranged so as to have the principal surface of the first plate member and the principal surface of the second plate member be roughly perpendicular to the principal surface of the current plate, and the current plate and the electric wave transmission antenna are adjacent to each other.

2. The core unit for a refrigeration unit according to claim 1, wherein the electric wave transmission antenna is a coil antenna.

3. The core unit for a refrigeration unit according to claim 1, wherein the electric wave transmission antenna is covered with a waterproof cover.

4. The core unit for a refrigeration unit according to claim 1, wherein the first magnetic bodies and the second magnetic bodies are made of a permanent magnet.

5. The core unit for a refrigeration unit according to claim 1, wherein the current plate is made of a stainless steel plate having openings.

6. A refrigeration unit, comprising:
one or more core unit(s) the refrigeration unit according to claim 1;
a freezer containing the one or more core unit(s); and
a cold air circulating device that supplies cold air between the first plate member and the second plate member via the current plate to freeze a subject to be frozen in the freezer.

* * * * *